United States Patent [19]
Smuda

[11] 3,732,763
[45] May 15, 1973

[54] STRIP WITHDRAWING DEVICE
[75] Inventor: Gerhard Smuda, Hamburg, Germany
[73] Assignee: Fried. Krupp Gesellschaft mit beschrankter Haftung, Essen, Germany
[22] Filed: Apr. 26, 1971
[21] Appl. No.: 137,546

[30] Foreign Application Priority Data
Apr. 25, 1970 Germany..............P 20 20 398.9

[52] U.S. Cl. ..........................83/98, 83/102, 83/155
[51] Int. Cl. .............................................B26d 7/06
[58] Field of Search..................83/102, 105, 107, 83/155, 98

[56] References Cited
UNITED STATES PATENTS

| | | |
|---|---|---|
| 2,071,097 | 2/1937 | Wennberg et al. ..................83/102 X |
| 1,747,182 | 2/1930 | Rosener...............................83/102 X |
| 2,427,223 | 9/1947 | Moore..................................83/155 X |
| 3,247,551 | 4/1966 | George.................................83/155 |
| 1,419,907 | 6/1922 | Worthington ......................83/155 X |
| 2,251,199 | 7/1941 | Piquet ................................83/155 X |

FOREIGN PATENTS OR APPLICATIONS
1,921,749  11/1970  Germany.............................83/155

*Primary Examiner*—Andrew R. Juhasz
*Assistant Examiner*—James F. Coan
*Attorney*—Walter Becker

[57] ABSTRACT

For use in connection with the building up of tires, a device for withdrawing strips cut off at a bias on a strip cutting device, which includes an endless conveyor belt having one of its reversing drums arranged close to the strip cutting device with the axis of rotation of said one reversing drum substantially parallel to the bias cut edge of the cut off edge while adjacent the other reversing drum there is provided a chute adapted to be pivoted into different directions for distributing cut off strips of web material over different processing paths.

6 Claims, 4 Drawing Figures

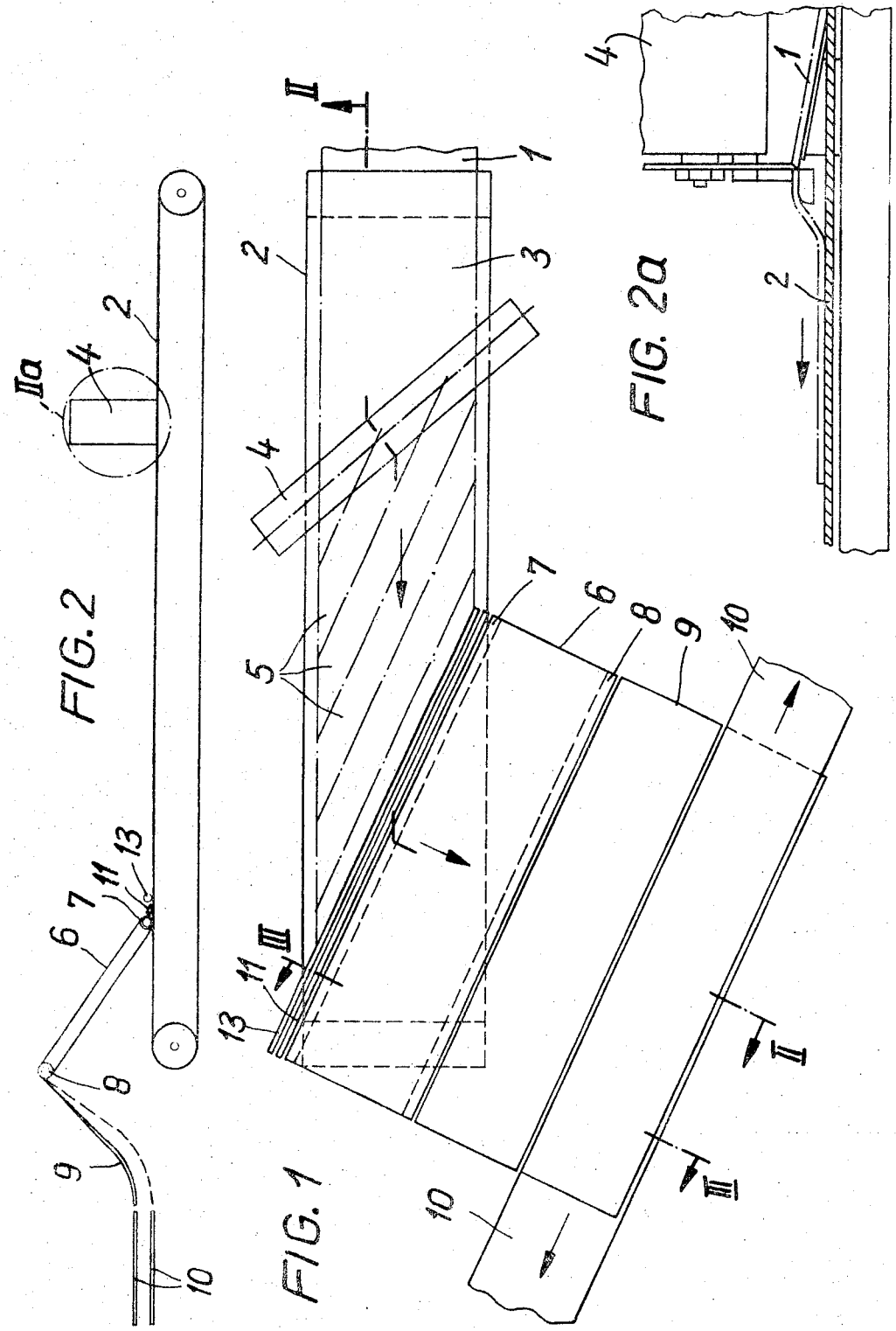

STRIP WITHDRAWING DEVICE

The present invention relates to a device for withdrawing strips of material from the cutting table of a strip cutting device as used in connection with the manufacture of tires.

With heretofore known strip cutting devices, the web of material wound off from reels containing the material is transported over a cutting table where the web of material is cut into individual strips the longitudinal edges of which extend at an angle with regard to the transporting direction while the starting and ending edges of the strips extend in the transporting direction. Each of these strips serves as one of a plurality of layers for building up the raw tire and for this purpose has to be withdrawn from the cutting table, has to be spliced to other strips and has to be fed to a tire building machine. The withdrawal of the strips from the cutting table and the subsequent splicing is carried out manually. Due to the time required for this operation, it will be apparent that with a continuously operating strip cutting device the maximum working speed, i. e., the processing capacity of such device, cannot be utilized to the full extent.

It is, therefore, an object of the present invention to provide a device which will overcome the above mentioned drawback, in other words, which will make it possible to operate continuously working strip cutting devices in conformity with their full output capacity while the transfer of the strips from the cutting table to the conveyor belt leading to the tire building machine will be fully mechanized.

This object and other objects and advantages of the invention will appear more clearly from the following specification in connection with the accompanying drawings, in which:

FIG. 1 is a top view of a device according to the invention with cutting table and subsequent transverse conveyor belts.

FIG. 2 is a side view of the arrangement shown in FIG. 1 but with a strip withdrawing device and cutting device turned in a direction transverse to the cutting table.

FIG. 2a is a portion of the cutting device shown in the dotted circle of FIG. 2.

Figure 3:
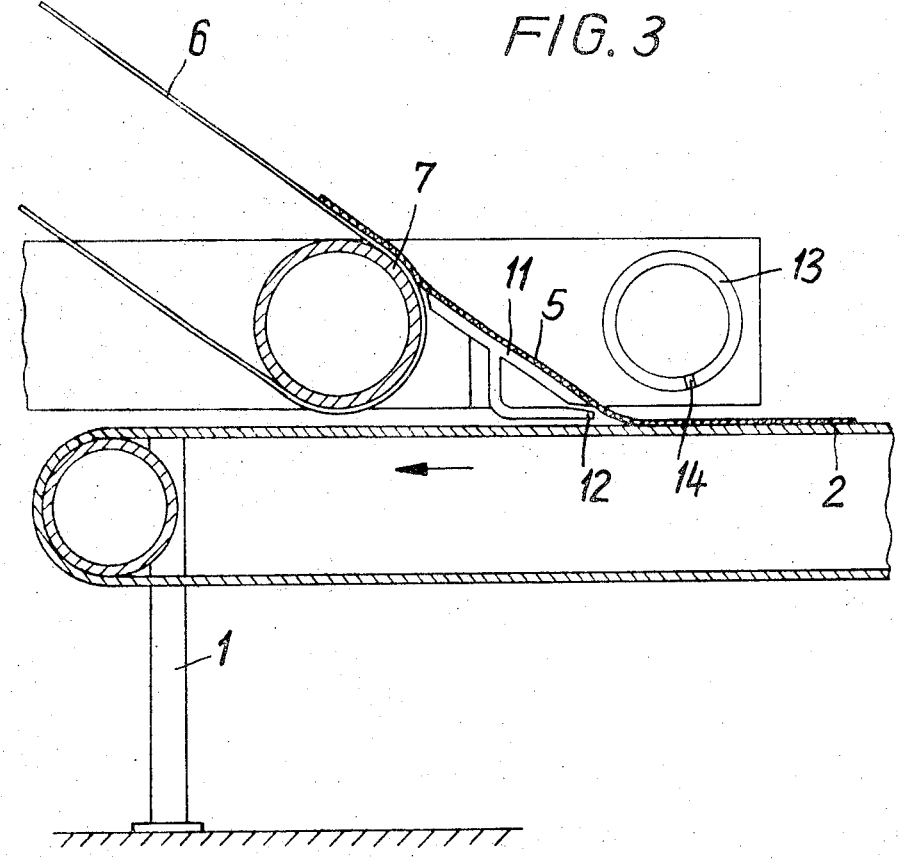
FIG. 3 shows a portion of the transfer station between the cutting table and the inclined conveyor belt.

The strip withdrawing device according to the present invention for the withdrawal of strips of material from the cutting table of a strip cutting device is characterized primarily in that there is provided a strip withdrawing conveyor belt which is arranged at an incline with regard to the conveyor belt feeding the material to be cut to the cutting table and ascends in the feeding direction of the feeding conveyor belt and feeds the strips in a direction transverse to the longitudinal edges of the strips, while the drum at the receiving end of the withdrawing conveyor belt which drum is located directly above the feeding conveyor belt is preceded by a guiding wedge member which bridges the distance between the said drum and the feeding conveyor belt, the drum at the discharge end of the withdrawing conveyor belt being followed by a chute adapted to be pivoted about the axis of the last mentioned drum, the arrangement being such that the outlet of the chute is selectively movable to an area adjacent one of a plurality of superimposed transverse conveyor belts conveying in the longitudinal direction of the cut-off strips.

A strip withdrawing device of this type can be operated at the same speed as a continuously operating strip cutting device. The alternate discharge of the strips onto one of a plurality of transverse conveyor belts permits a distribution of the strips onto a plurality of assembly lines which can be loaded at a correspondingly reduced speed so that for the splicing operation carried out on each of the assembly lines the required time will be available. A careful transfer of the strips of rubberized fabric layers from the cutting table to the inclined conveyor belt, as it is necessary in view of the sensitive strips which have no solid consistency, is effected by the interposed guiding wedge member. If this is not sufficient, it is suggested, according to a further development of the present invention, that the guiding wedge member has its lower edge provided with air outlets directed against the feeding direction of the feeding conveyor belt. The air blown through these outlets will safely prevent any damage to the material of the strips when they are being lifted off the cutting table or the feeding conveyor belt. Also the pressure exerted by the strips upon the guiding wedge member will thus be reduced so that the strips will also at this area not be subjected to any changes in shape.

In order to avoid a fluttering of the edges of the strips when the strips are transferred from the feeding conveyor belt to the guiding wedge member, it is suggested according to the invention, in front of the guiding wedge member and above the feeding conveyor belt to provide air conveying means with air outlets directed in donward direction. In this way a floating of the strips due to a premature lifting off of the rear edge of a strip from the cutting table prior to the front edge of a strip reaching the inclined withdrawing conveyor belt will be avoided.

It is also suggested according to the invention to arrange the strip withdrawing device in such a way that it will be pivotable about a vertical axis in order to be able to adapt the strip withdrawing device to different directions of the longitudinal edges of the strips. With this arrangement the strip withdrawing device can, for all practical pusposes, be employed in an unlimited manner inasmuch as the longitudinal edges of the strips, i. e., the cutting lines, can on the cutting table extend in any desired direction. By a corresponding pivoting of the strip withdrawing device it will be assured that the strips will always be withdrawn in a direction transverse to the longitudinal edges of the strips.

Referring now to the drawings in detail, a web 1 of material withdrawn from a reel containing a bale of material is by means of a feeding conveyor belt 2 moved over a cutting table 3 where a cutting device 4 in a continuous manner cuts off from the web 1 of material strips 5 at an angle with regard to the longitudinal direction of the web 1 of material. An inclined strip withdrawing conveyor belt 6 which receives the strips at a longitudinal edge thereof has its drum 7 at the receiving side of the withdrawing conveyor belt located on the cutting table 3. Adjacent the discharge drum 8 at the discharge end of the strip withdrawing conveyor belt 6 there is provided a pivotable chute 9 the outlet of which is located either adjacent an upper or a lower transverse conveyor belt 10 (the lower transverse conveyor belt being shown in dash lines in FIG. 2). At the transfer area between the cutting table 3 and the withdrawing conveyor belt 6 there is provided a guiding wedge member 11. Adjacent the lower edge of the member 11 there are located the mouths of air outlets 12 which are directed against the feeding direction of the feeding conveyor belt 2. The blown out air lifts the longitudinal edge of the respective strip which latter as a result thereof will easily slide onto the guiding wedge member 11. Slightly spaced from and in front of the wedge member 11 there is located an air conduit 13 above the feeding conveyor belt 2 which air conduit 13 is provided with downwardly directed air outlets 14. By means of the air flowing through the outlets 14, the strip therebelow is pressed against the feeding conveyor belt 2 prior to arriving in the vicinity of the wedge member 11. The strip withdrawing device comprising the air conduit 13, the guiding wege member 11, the withdrawing conveyor belt 6 and the chute 9 is pivotable about a vertical axis so that it can be adjusted in conformity with different directions of the longitudinal edges of the strips. The strip withdrawing device will thus always feed the strips at a right angle to the respective longitudinal direction of the strips.

It is, of course, to be understood that the present invention is, by no means, limited to the particular showing in the drawings but also comprises any modifications within the scope of the appended claims.

What I claim is:

1. For use in connection with the manufacture of tires: cutting table means, first endless conveyor belt means operable to continuously convey web material to be cut into strips onto said cutting table means, adjustable cutting means arranged above said table means for cutting web material on said table means on a bias into strips, second endless conveyor belt means with first and second reversing drums therefor respectively arranged at the reversing end portions of said second conveyor belt means, said first reversing drum being located relatively close to said cutting means, and said second reversing drum being located relatively remote from said cutting means, said second conveyor belt means extending at an angle with regard to said first conveyor belt means, bridge means having an inclined conveying surface and being interposed between said cutting means and said first reversing drum for conveying cut-off strips of web material to said second conveyor belt means, and distributing means arranged adjacent said second reversing drum and movable selectively into different directions for receiving cut-off strips from said bridge means and in a desired cycle distributing the same to different discharging paths, and air nozzle means arranged below said bridge means and directed in the direction toward said first conveyor belt means for facilitating the transfer of strips cutoff by said cutting means onto said bridge means.

2. An arrangement according to claim 1, in which said distributing means is formed by a pivotable chute.

3. An arrangement according to claim 1, in which said second reversing drum is located at a level higher than the level of said first reversing drum.

4. An arrangement according to claim 1, which includes air nozzle means located between said bridge means and said cutting means and directed downwardly for blowing air upon the cut-off strip to hold the same against the support therefor.

5. An arrangement according to claim 1, in which said second conveyor belt means is adjustable about a vertical axis for varying its angle relative to said first conveyor belt means.

6. An arrangement according to claim 1, in which the axis of rotation of said first reversing drum is substantially parallel to the bias cut edge of a cut-off strip of web material.

* * * * *